United States Patent [19]
Fuller

[11] Patent Number: 6,106,775
[45] Date of Patent: Aug. 22, 2000

[54] MODIFYING AN ATMOSPHERE WITH AN AQUEOUS COMPOSITION INCLUDING SODIUM BICARBONATE AND ACETYLSALICYLIC ACID

[75] Inventor: Peter E. Fuller, Woods Cross, Utah

[73] Assignee: Applied Humidity Technologies, West Valley City, Utah

[21] Appl. No.: 09/405,428

[22] Filed: Sep. 23, 1999

Related U.S. Application Data

[60] Provisional application No. 60/103,705, Oct. 9, 1998.

[51] Int. Cl.$^7$ ................. A61L 9/04; A24F 25/00
[52] U.S. Cl. ................. 422/40; 422/4; 422/120; 422/123; 422/306; 426/418; 426/419; 426/506
[58] Field of Search ............... 422/4, 5, 40, 120, 422/122, 123, 305, 306; 426/418, 419, 506

[56] References Cited

U.S. PATENT DOCUMENTS

| | | |
|---|---|---|
| 314,223 | 3/1885 | Clark . |
| 977,374 | 11/1910 | De Lano . |
| 1,589,215 | 6/1926 | Ordway . |
| 1,655,248 | 1/1928 | Sharp . |
| 1,801,194 | 4/1931 | Dovre . |
| 2,561,798 | 7/1951 | Jensen ........................ 299/20 |
| 2,958,469 | 11/1960 | Shuster ...................... 239/56 |
| 3,227,374 | 1/1966 | Valentine .................... 239/56 |
| 3,652,423 | 3/1972 | Roberts ....................... 252/180 |
| 3,706,140 | 12/1972 | Brillaud et al. ............... 34/60 |
| 3,754,803 | 8/1973 | Underwood et al. . |
| 3,801,011 | 4/1974 | Guehler et al. .............. 239/34 |
| 3,924,807 | 12/1975 | Morgan ....................... 239/55 |
| 3,940,062 | 2/1976 | Rainey ........................ 239/56 |
| 4,192,773 | 3/1980 | Yoshikawa et al. ........ 206/205 |
| 4,275,811 | 6/1981 | Miller ......................... 206/204 |
| 4,664,922 | 5/1987 | Leon et al. .................. 426/124 |
| 4,762,722 | 8/1988 | Izumimoto et al. ......... 426/124 |
| 4,995,556 | 2/1991 | Arnold, III .................. 422/122 |

*Primary Examiner*—Robert J. Warden, Sr.
*Assistant Examiner*—Fariborz Moazzam
*Attorney, Agent, or Firm*—Workman, Nydegger & Seeley; R. Burns Israelsen

[57] ABSTRACT

Evaporation devices and associated methods for introducing humidity into an atmosphere. The evaporation device includes a substantially rigid shell encasing an absorbent material and having a plurality of holes extending therethrough to permit air flow between the exterior and interior of the shell. The absorbent material can be a natural or synthetic sponge capable of absorbing and retaining water. After applying water to the evaporation device, it is placed in an environment to which humidity is to be introduced. Evaporation of water can be enhanced by placing a mixture of aspirin and sodium bicarbonate on the absorbent material. Examples of methods for using the evaporation device include placing the evaporation device in produce bins, produce refrigerators, cheese and meat refrigerators, and containers of dry foods, such as cookies and brown sugar.

26 Claims, 6 Drawing Sheets

FIG. 9

MODIFYING AN ATMOSPHERE WITH AN AQUEOUS COMPOSITION INCLUDING SODIUM BICARBONATE AND ACETYLSALICYLIC ACID

RELATED APPLICATION

This application claims the benefit of U.S. Provisional Patent Application Serial No. 60/103,705, entitled "Apparatus and Methods for Evaporating Liquid into an Atmosphere," and filed Oct. 9, 1998, which is incorporated herein by reference.

BACKGROUND OF THE INVENTION

1. The Field of the Invention

The present invention relates to devices and methods for evaporating water or another liquid into an atmosphere. More specifically, the present invention relates to self-contained devices having a shell enclosing an absorbent material and having holes formed therethrough, whereby moisture can be evaporated into the atmosphere, and further relates to methods for using such self-contained devices to supply the humidity to the atmosphere.

2. The Prior State of the Art

Over the years, many systems and devices for introducing water vapor into the air or for elevating and maintaining the humidity level in the air have been developed. Electrically powered humidifying devices, which actively vaporize water or otherwise cause it to be evaporated into the air, are perhaps the most widely used. Although such humidifying devices are capable of adequately introducing water vapor into the air in many environments, there are several disadvantages and limitations associated with them.

First, electrically powered humidifying devices are typically relatively complex, with moving parts that induce the flow of air or that actively vaporize water. The cost of manufacturing such humidifying devices frequently precludes them from being used in situations where they would otherwise be beneficial. Likewise, the cost of supplying electrical energy further makes their use impractical in many settings.

It has also been found that conventional humidifying devices are generally bulky and not capable of being easily transported to new locations. For example, humidifying devices used in refrigeration systems and in many human environments are generally permanently or temporarily fixed in place and cannot be easily moved. Furthermore, conventional humidifying devices are often associated with periodic maintenance that increases the cost of ownership and operation, thereby making such devices less likely to be used in many situations.

In view of the foregoing features of conventional humidifying devices, there is a need in the art for humidifying devices that are relatively inexpensive to manufacture and operate. It would also be desirable to provide humidifying devices that can be operated without electrical power or other external power supplies. It would be a further advantage if such humidifying devices were portable and easily handled by users. Furthermore, it would be advantageous to provide humidifying devices that are self-contained and that can be placed in desired environments without having to be permanently or temporarily secured them to a supporting structure.

SUMMARY AND OBJECTS OF THE INVENTION

The present invention relates to devices for evaporating water or other liquids into an atmosphere. The evaporation devices of the invention include a substantially rigid shell encasing an absorbent material. The shell has a plurality of holes formed therethrough that permit air to pass between the exterior and the interior of the evaporation device. Water is applied to the absorbent material. The evaporation device is then placed in a desired environment, where it releases evaporated water into the atmosphere.

The evaporation devices of the invention provide significant advantages over conventional humidifying devices. The evaporation devices are self-contained units that do not require electrical power or other external energy sources. Accordingly, the evaporation devices can be used in many environments where conventional humidifying devices have been impractical or impossible. The cost of manufacturing and operating the evaporation devices disclosed herein are less than those associated with conventional humidifying systems, due to the simple design of the evaporation devices, their lack of moving parts, and their ability to operate without electricity. Another advantage of the evaporation devices of the invention is their portability and reusability in different locations.

It has been found that the evaporation devices can be used in many applications. For example, the devices of the invention may be used to introduce humidity to produce bins and produce trucks and refrigerators, thereby extending the shelf life of produce beyond what has been previously possible. The invention can also be used to prevent exposed, refrigerated meats, cheeses, and other similar foods from prematurely discoloring or spoiling. The shelf life of cookies, breads, cakes, brown sugar, tortillas, and other dry or non-refrigerated foods can be extended according to the invention.

The evaporation devices also have use in human environments. For example, they can be placed near a sleeping person to prevent respiratory passages from drying out. Such techniques are particularly advantageous to treat persons suffering from asthma or other respiratory illnesses. One or more evaporation devices situated in an oxygen flow delivered to a supplemental oxygen-dependent person can raise humidity levels of the oxygen and prevent the pronounced dryness of the respiratory system that is otherwise frequently experienced by such persons. In yet another application, medicaments can be evaporate, into an atmosphere for delivery to a patient's respiratory system in a non-invasive process. In any of the foregoing examples, the evaporation devices provide the advantages of low cost, portability, non-electricity consumption, and reusability.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 9 is a flow chart illustrating the steps of a method according to the invention for assembling an later using an evaporation device to deliver medicaments to a patient.

DETAILED DESCRIPTION OF THE PREFERRED EMBODIMENTS

The present invention relates to devices for evaporating water or other liquids into an atmosphere. The evaporation devices of the invention can include a substantially rigid shell encasing an absorbent material. Holes are formed through the shell to permit the flow of air between the exterior and interior of the shell. When water is applied to the absorbent material, the evaporation device can be placed in any of a number of selected environments in order to increase or maintain the humidity level of the environment.

The evaporation devices can be self-contained, portable and capable of being placed in and removed from desired locations. Preferred embodiments of the evaporation devices of the invention are passive, in that they do not require an electrical power supply or other external power sources. Instead, the evaporation devices are placed in substantially any environment to which humidity is to be introduced and can operate without electrical energy.

The evaporation devices have been found to have a variety of uses. The invention extends to methods for introducing humidity into selected environments according to the techniques disclosed herein. For example, the evaporation devices can be used to extend the shelf life of vegetables and other produce in commercial and consumer settings. In addition the evaporation devices can be used to preserve meats, cheeses, other dairy products, and other foods in refrigerated environments. The evaporation devices have also been found to extend the shelf life and preserve the taste and other properties of dry food, such as breads, cookies, brown sugar, tortillas, and the like, in refrigerated and non-refrigerated environments.

In addition to the food preservation capabilities of the evaporation devices disclosed herein, it has been found that they can be used to condition human environments and to deliver humidity or medication to patients. For example, an evaporation device placed near a sleeping person can introduce humidity into the person's environment and can improve the person's ability to breathe, particularly for those suffering from asthma or other respiratory ailments. According to another example, one or more of the evaporation devices can be placed in an oxygen flow that is delivered to a supplemental oxygen-dependent patient to humidify the oxygen flow and to reduce or eliminate the respiratory dryness that is often experienced by such patients. Instead of water, medicaments can be applied to the absorbent material in the evaporation devices. One or more of such medicament-laden evaporation devices can be placed in a flow of oxygen or air to deliver the medicament to a patient.

Figure 1:
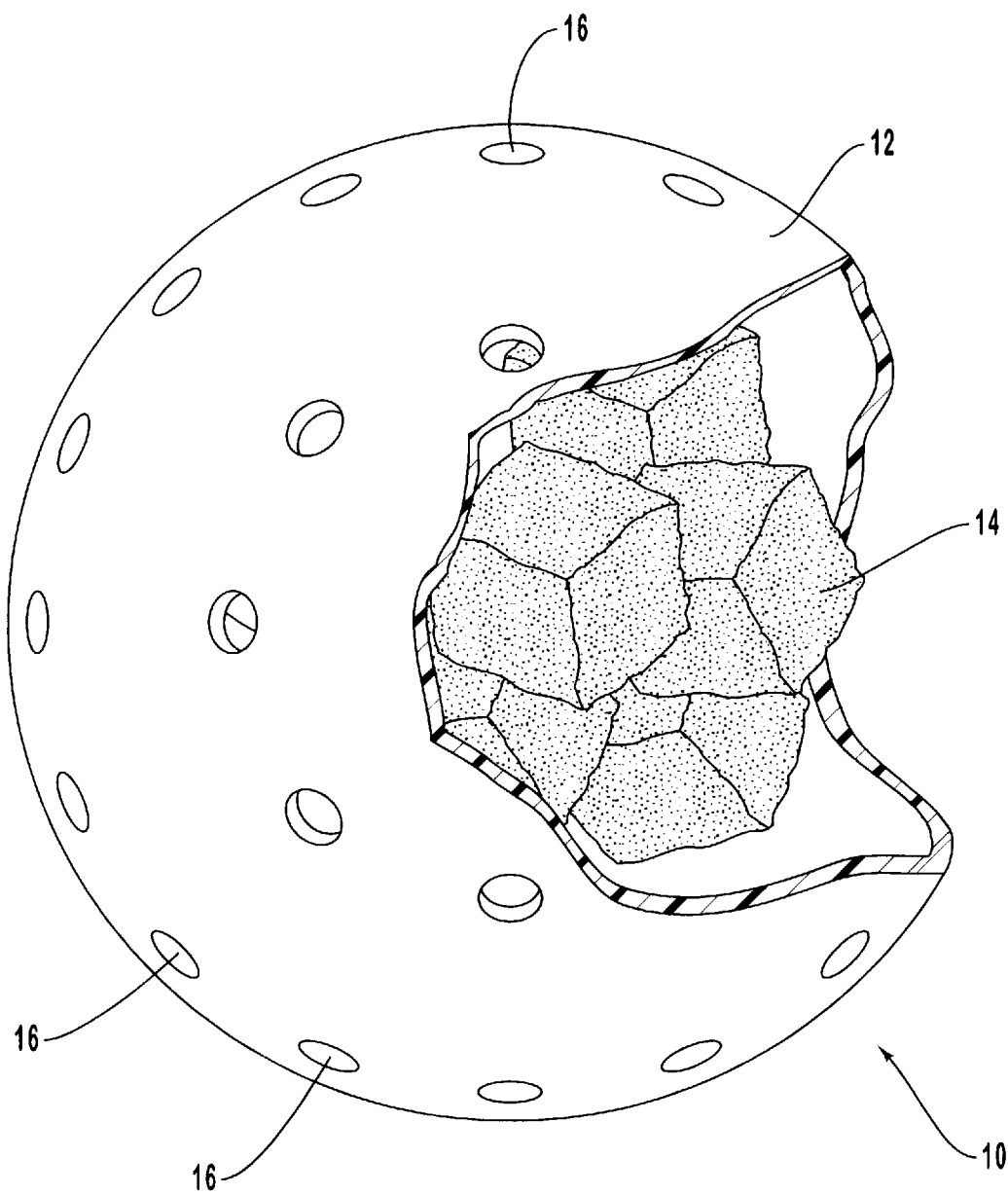
FIG. 1 is a breakaway perspective view illustrating an evaporation device according to the invention.

FIG. 1 illustrates one embodiment of the evaporation devices of the invention. Evaporation device 10 includes a substantially rigid outer shell 12 (shown in breakaway view) encasing an absorbent material 14. Shell 12 has one or more holes 16 formed therethrough, which permits the transport of gas between the interior and the exterior of the shell. Preferably, shell 12 has a plurality of holes 16 randomly or regularly spaced thereon. The size of holes 16 can be selected to substantially prevent portions of absorbent material 14 from protruding outside of shell 12 during use and to substantially prevent objects in the environment of evaporation device 10 from coming in contact with the absorbent material 14. The size and number of holes 16 on shell 12 can be selected to increase or decrease the air flow rate between the interior and exterior of shell 12, thereby allowing the rate of evaporation to be partially controlled.

Absorbent material 14 can be essentially any material capable of retaining water in a manner that allows the water can be evaporated into the atmosphere. Suitable examples of absorbent material 14 include natural sponges and synthetic sponges, such as those commonly used in household settings. When absorbent material 14 consists of natural or synthetic sponges, the absorbent material can be divided into cubes or other regular or irregular shapes, one example of which is illustrated in FIG. 1. Dividing absorbent material 14 into multiple pieces as illustrated provides the advantage of permitting air to flow around and between the pieces, and also increases the exposed surface area of the absorbent material from which moisture can evaporate.

In a preferred embodiment, absorbent material 14 is not packed in shell 12 so tightly that the interstices between the individual pieces and between the absorbent material and shell 12 are eliminated. Preserving some air space inside shell 12 permits adequate air flow through device 10, thereby enhancing evaporation of moisture. Packing considerations are particularly important when absorbent material 14 is a material that swells or expands when exposed to moisture. For example, absorbent material 14 is often packed in shell 12 in a dry state, with a size that may be significantly smaller than the size of the absorbent material when it is later exposed to water.

Shell 12, depending on the environment in which evaporation device 10 is to be used, can be constructed of any of a large number of materials. In one embodiment, shell 12 is constructed of a substantially rigid thermoplastic or thermosetting plastic. The factors involved in selecting the material for shell 12 can include water resistance, durability, wear properties, and inertness with respect to the materials expected to be encountered in the environment of evaporation device 10. Other examples of materials for use in shell 12 include metals and, in some applications, wood.

Once evaporation device 10 is manufactured as shown in FIG. 1, it is ready to be used to supply humidity to the environment. To do so, water is applied to absorbent material 14. For example, device 10 can be immersed in a volume of water or water can be poured over device 10. In either case, water enters holes 16 and is absorbed by absorbent material 14.

Evaporation device 10 introduces humidity into an environment as the water is evaporated from the surfaces of absorbent material 14 into the air contained within shell 12. Holes 16 permit humidified air to flow out of shell 12, and also allow water vapor to diffuse into the external environment. As can be seen in FIG. 1, evaporation device 10 can be an entirely passive device, in the sense that no electrical or other power supply is required. Moreover, in many instances, evaporation device 10 can supply a suitable amount of humidity without the use of fans or other devices for generating an air flow over the evaporation device. Of course, in some situations, inducing an air flow over and through evaporation device 10 using any desired external system can enhance the evaporation and introduction of moisture into the environment.

One advantage of the evaporation devices of the invention is that they can be used in environments where electrically operated humidifying devices would be impractical, undesirable, or impossible to use. Another advantage of the evaporation devices of the invention is the low cost of manufacturing and use compared with humidifiers that require electrical energy.

Some or all of the water retained in absorbent material 14 can eventually evaporate. However, evaporation device 10 can be easily recharged and reused by again applying water to absorbent material 14. Evaporation device 10 can have substantially any desired size or shape. While evaporation device 10 of FIG. 1 is spherical, other shapes can be used. In many circumstances, it can be desirable to provide evaporation devices 10 having a size sufficiently small to allow them to be lifted by a user and to be easily immersed in a volume of water. However, it should be recognized that evaporation devices can be as large as desired. It is noted that the surface area of three-dimensional objects does not increase proportionally to increases in the diameter of the objects. Accordingly, the evaporation efficiency of the evaporation devices of the invention can often be enhanced by providing several small devices as opposed to a single, larger evaporation device.

Because of the self-contained and portable nature of evaporation device 10, the evaporation device can be relatively easily sterilized between uses if desired. For example, evaporation device 10 can be immersed in boiling water or can be exposed to other thermal or chemical sterilization means.

It has also been found that the evaporation properties of evaporation device 10 can be enhanced by the application of certain chemicals to absorbent material 14. In one embodiment, a composition that is formed from combining acetylsalicylic acid (aspirin) and sodium bicarbonate (baking soda) facilitates and prolongs the evaporation of moisture into the environment of evaporation device 10. While the amount and proportion of aspirin an and sodium bicarbonate is certainly not critical, it has been found that the invention can be practiced by applying the aspirin and sodium bicarbonate in roughly equal proportions by weight in powdered form to absorbent material 14 before the absorbent material is encased in shell 12. However, other relative proportions of aspirin and sodium bicarbonate are entirely adequate. Likewise, the absolute amount of aspirin and sodium bicarbonate is not critical, but can be selected such that a suitable amount of these materials remain at absorbent material 14 after repeated uses of evaporation device 10.

While the inventor does not wish to be limited to any particular theory of operation, it is presently believed that sodium bicarbonate is the component that enhances the evaporation of water from absorbent material 14 into the environment. Likewise, it is presently believed that the aspirin prolongs the activity of sodium bicarbonate by inhibiting the sodium bicarbonate from caking or otherwise prematurely drying out. The invention can also be practiced using sodium bicarbonate alone without the presence of aspirin. The invention also extends to using, on absorbent material 14, other chemicals that enhance the evaporation of water into the environment. It is also to be understood that the evaporation devices of the invention can be constructed and used without any sodium bicarbonate, aspirin, or other such chemicals.

Figure 2:
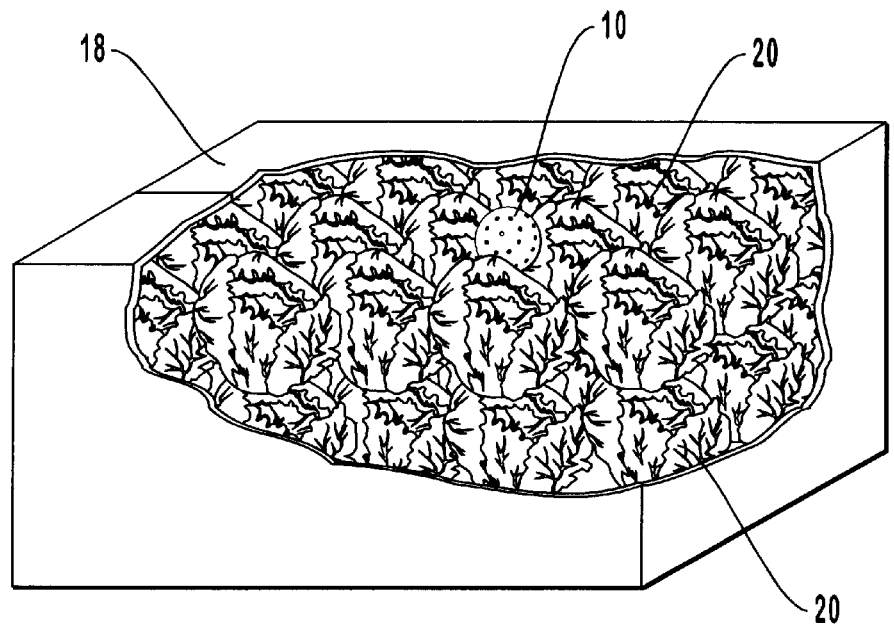
FIG. 2 is a breakaway perspective view depicting a produce crate equipped with the evaporation device of FIG. 1.

FIG. 2 illustrates an evaporation device of the invention being used to preserve the shelf life of produce. Evaporation device 10 is constructed and activated by the application of water as described above in reference to FIG. 1. FIG. 2 illustrates a produce crate 18 (shown in break away perspective). Crate 18, in this example, contains heads of lettuce 20 that have been packed after being harvested and in preparation to be shipped to retailers, where the lettuce will be sold to consumers. It is widely understood in the produce industry that lettuce, other vegetables, and other produce have a limited shelf life, and must be sold to consumers within a specified amount of time. The limited shelf life contributes to significant shipping and handling expenses, since the produce must be delivered to the consumer is a short amount of time.

In just one example, it is standard practice in the produce industry to sell lettuce to consumers within four or five days after the lettuce has been harvested from the field. Accordingly, lettuce ordinarily is shipped to the retailer within about 72 hours after harvest. This rough 72-hour standard limits the distance that lettuce can be shipped by truck from particular growing areas. Moreover, for geographic regions relatively distant from lettuce growing areas, lettuce must be in transport nearly night and day in order to arrive within the 72 hours. Such intense shipping practices combined with occasional spoilage contributes to the expense of produce at the consumer level.

It has been found that including an evaporation device 10 in crate 18 before lettuce 20 or other produce is shipped can inhibit the spoilage or other degradation of the produce. When evaporation device 10 is placed in the environment of lettuce 20 or other produce, particularly in closed spaces as shown in FIG. 2, the humidity introduced into the environment has a preservative effect on the produce.

Delivering humidity to refrigerated produce environments as shown in FIG. 2 has significant advantages over merely placing electrically operated humidifying systems in refrigerated trucks or other refrigerators. For example, evaporation device 10 can be conveniently placed within individual crates as shown in FIG. 2, which has not been possible using electrical systems. Moreover, the evaporation devices of the invention are significantly less expensive to manufacture and operate the electrically powered humidifying systems. In addition, evaporation device 10 can remain in crate 18 after the crate is transported from the truck space to the retailer's cold storage unit.

Beyond such logistical advantages, it has been found that the use of the evaporation devices of the invention can extend the usable life of lettuce and other produce well beyond what has been achieved by conventional electrically powered humidifying systems. In one experiment, it was found that the evaporation devices disclosed herein extend the usable life of lettuce an additional six days. In particular, the onset of yellowing of lettuce leaves and other degradation of the lettuce was delayed about six days when evaporation device 10 was placed in crate 18 before shipping. Such food preservation capabilities can have great advantages in the produce industry. Shipping expenses can be reduced because the urgency of delivering the produce to the retailer is diminished. In addition, the retailer can now receive produce shipments on a weekly basis instead of receiving shipments every day or several times a week as has previously been common.

While FIG. 2 illustrates evaporation device 10 being used with lettuce, it is to be understood that the invention can be practiced with substantially any other type of vegetable and with many fruits to extend the usable life thereof. The invention also extends to methods wherein the evaporation devices are used at the retail level or in consumers refrigerators to preserve produce.

Figure 3:
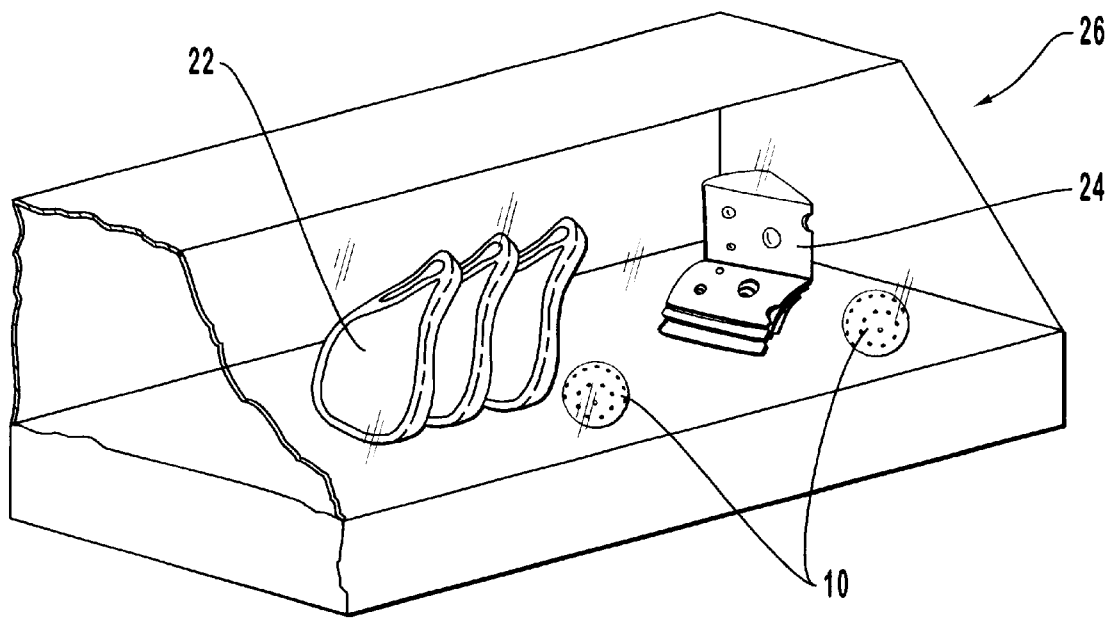
FIG. 3 is a perspective view illustrating a refrigerated display case containing meats and cheeses and being equipped with the evaporation device of FIG. 1.

FIG. 3 illustrates another use of the evaporation devices of the invention, whereby meats, cheeses, and other refrigerated foods are preserved. Restaurant operators and grocery retailers often display meats 22, cheeses 24, and other similar foods in refrigerated display units 26. In order to display these foods to consumers, they are often left uncovered. However, the exposure of meats 22 and cheeses 24 to the ambient air induces a degradation process that discolors the food and can also have a deleterious effect on the foods' taste.

It has been found that including one or more evaporation devices 10 in refrigerated display unit 26 inhibits the discoloration of meats 22 and cheeses 24 and otherwise preserves the shelf life thereof. The portable, reusable, and non-energy consumptive properties of evaporation devices 10 provide many of the same advantages in the context of FIG. 3 as those described in the other examples disclosed herein. Among the many advantages of using evaporation devices 10 in refrigerated display units 26, the food contained therein can be left uncovered for an extended period of time. For example, retailers and restaurant operators have the option of leaving meats 22 and cheeses 24 uncovered overnight, while preserving the appearance of the food and otherwise extending its shelf life. This embodiment of the methods of the invention can also be practiced in other refrigerated units at the retail level and in refrigerators of consumers.

Figure 4:
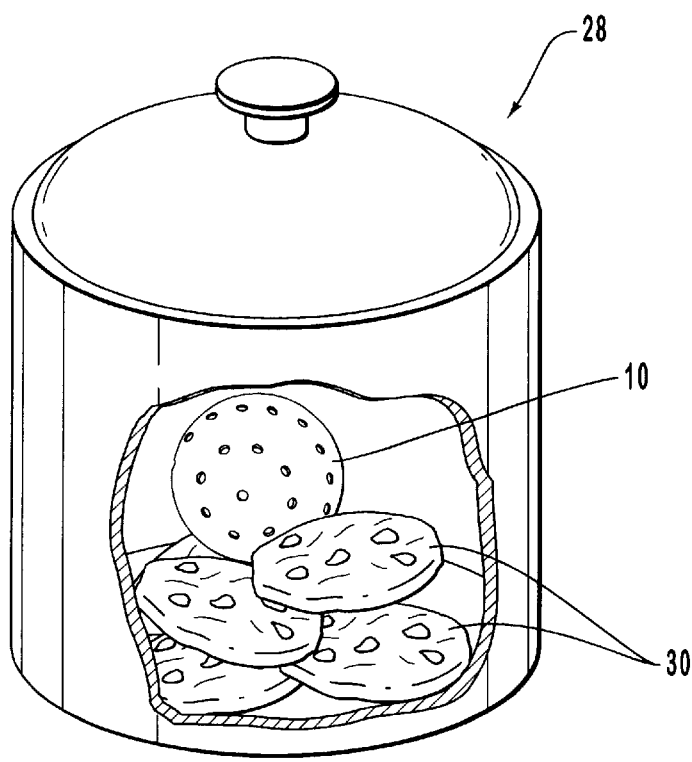
FIG. 4 is a breakaway perspective view showing a cookie jar containing cookies and the evaporation device of FIG. 1.

As illustrated in FIG. 4, the evaporation devices can be used to preserve food in non-refrigerated environments. According to one example, cookie jar 28 has cookies 30 stored therein. It has been widely observed in the past that cookies rapidly dry out when stored in cookie jars at room temperature. It has been found that introducing an evaporation device 10 into cookie jar 28 can significantly increase the shelf life of cookies 30. Evaporation device 10 can similarly be used to preserve breads, tortillas cakes, brown sugar, and other dry foods.

Figure 5:
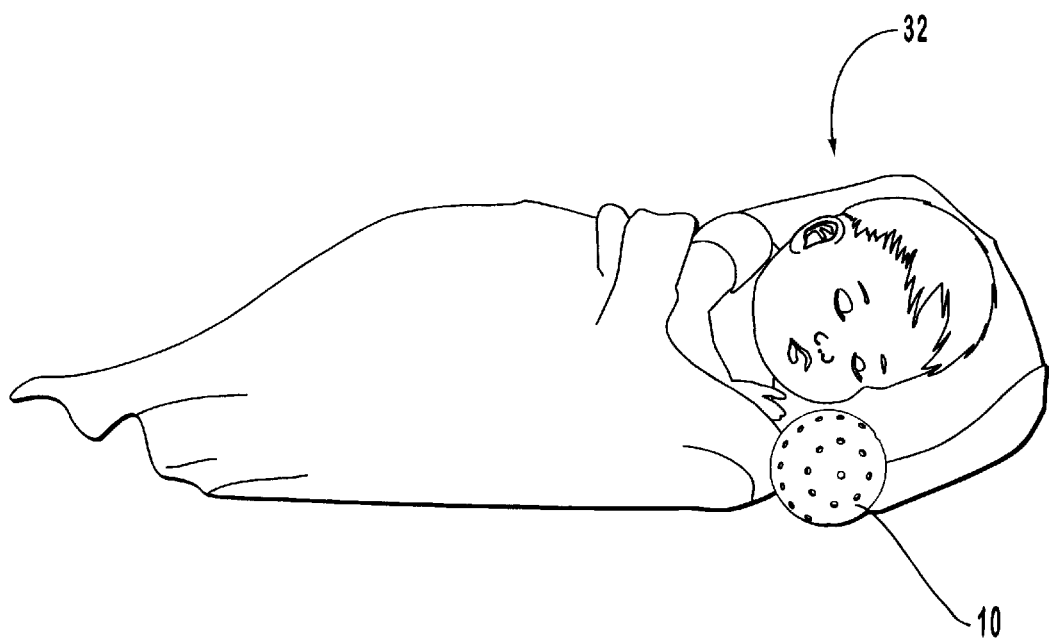
FIG. 5 is a perspective view illustrating the evaporation device of FIG. 1 being used in a human environment.

It has also been found that the invention can be used to advantageously introduce and maintain a relatively high humidity level into human environments. The evaporation devices can be used to introduce humidity into air breathed by a person. While the evaporation device is not limited to the setting depicted in FIG. 5, it has been discovered that a particularly useful method of the invention involves placing an evaporation device 10 near a sleeping person 32. When evaporation device 10 is charged with water, it can introduce enough water vapor into the atmosphere to substantially prevent breathing passages from drying out in otherwise dry air. While any person can benefit from the use of evaporation device 10 as shown in FIG. 5, this embodiment can be particularly useful to persons with asthma or other respiratory ailments.

The use of the evaporation devices of the invention to deliver humidity to the atmosphere of a human environment has significant advantages similar to those discussed herein in reference to other examples. For instance, evaporation device 10, requiring no electrical energy, can be inexpensive to manufacture and operate. Furthermore, evaporation device 10 can be placed very near to the face of person 32 when compared to electrically powered humidifying appliances for safety and other practical concerns, that have been conventionally used for similar purposes. Indeed, evaporation device 10 can be placed on the bed of person 32, whereas electrically operated humidifying appliances must be placed at a distant location in the room. The invention can also be practiced in any of a large number of other human environments.

Figure 6:
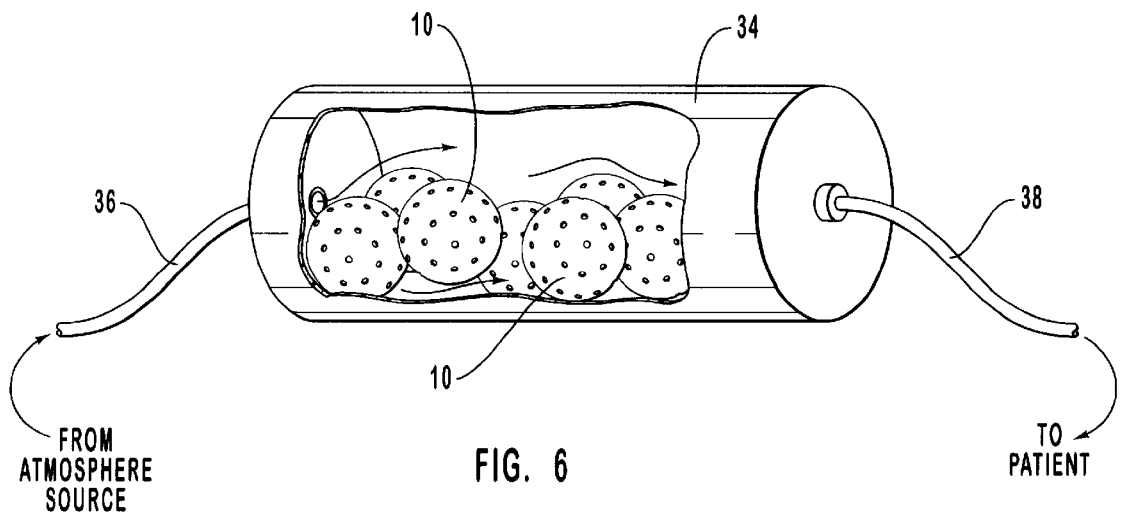
FIG. 6 is a breakaway perspective view illustrating a portion of a system equipped with a plurality of the evaporation devices of FIG. 6, wherein the system delivers oxygen or air to a patient.

FIG. 6 illustrates a further embodiment of the methods of the invention, whereby the evaporation device introduces an evaporated material into an air flow delivered to a patient. FIG. 6 illustrates a segment of a system that delivers oxygen or air to a patient. A chamber 34 of the system has an inlet tube 36 that delivers oxygen or air from an atmosphere source. The atmosphere source may be an oxygen tank or a fan or another device that induces an air flow through inlet tube 36. Likewise, chamber 34 has an outlet tube 38 for delivering oxygen or air to the patient. One or more evaporation devices 10 are placed in chamber 34 for purposes further described below.

In one embodiment, the system of FIG. 6 can be used to introduce water vapor into an oxygen flow delivered to a patient dependent on a supplemental source of oxygen. In the past, it has been found that patients requiring a supplemental flow of oxygen frequently experience pronounced drying and irritation of the respiratory system. The water vapor that is inexpensively introduced to the oxygen flow can significantly alleviate this problem. As oxygen flows from inlet tube 36 into chamber 34 and around and through evaporation devices 10, water vapor is introduced into the oxygen. Because FIG. 6 illustrates evaporation devices 10 being used in an environment having an induced flow of atmosphere, water vapor can be introduced at an even greater rate in this example than in many of the other examples that do not have an induced airflow.

The example of FIG. 6 also illustrates an environment in which the evaporation devices can be used to provide evaporation of substances other than water. In particular, the absorbent material of evaporation devices 10 can receive a medicament capable of being evaporated into air or oxygen. As the air or oxygen passes from inlet tube 36, through chamber 34 and around and through evaporation devices 10, a controlled amount of a medicament can be introduced into the gas flow. The medicament-laden air can then be delivered to the respiratory system of a patient via outlet tube 38.

Figure 7:
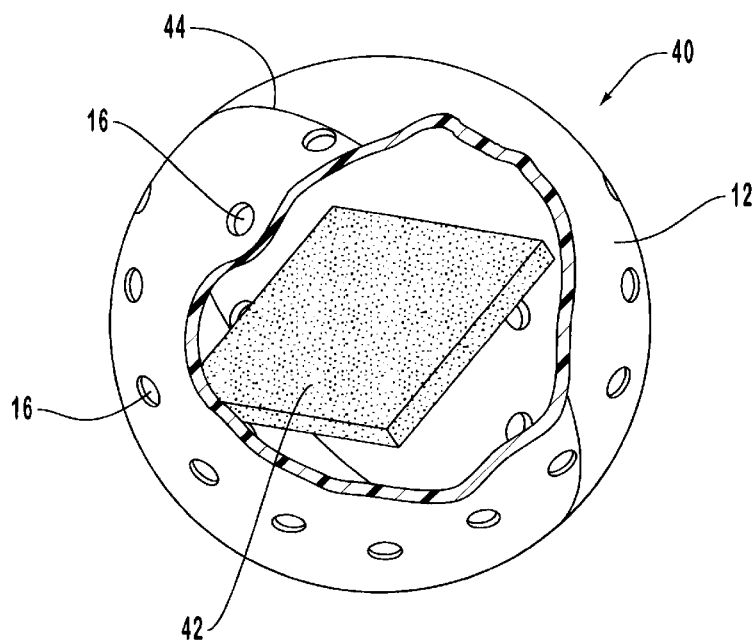
FIG. 7 is a breakaway perspective view depicting an evaporation device of the invention including a wafer substrate on which medicaments are carried.

Any of a wide variety of medications that can be evaporated, inhaled, and absorbed by a patient through the lungs may be used in evaporation devices 10. While the evaporation devices used to deliver medication to a patient can be that illustrated in FIG. 1, evaporation device 40 of FIG. 7 can alternatively be used. Like avaporation device 10 of FIG. 1, avaporation device 40 includes a shell 12 having holes 16 formed therethrough. Shell 12 in this embodiment includes a wafer 42, which can be a gauze strip, a substrate, or any other structure for absorbing or supporting the medicament. In this embodiment, shell 12 is capable of being opened at a seam 44, which is one example of the means for opening shell 12.

For example, seam 44 can be formed where the two hemispheres of shell 12 are threadedly and removably engaged one with another, thereby allowing water 42 to be removed and replaced between uses. While evaporation device 40 contains a wafer 42 instead of the absorbent material 14 of FIG. 1, the operation of the evaporation device is very similar to the other evaporation devices disclosed herein. In particular, air or another gas passes through holes 16 into the interior of shell 12, where it receives the water vapor or medicament evaporated from wafer 42.

The invention extends to still other methods for using the evaporation devices. For example, an evaporation device having a shell and enclosed absorbent material can be used to introduce water vapor to plant environments. Such plant environments can include greenhouses, terrariums, and the like. Placing the evaporation device in plant environments can reduce the frequency by which plants must be watered, and can maintain a desirably high level of humidity. In another embodiment, an evaporation device can be configured to receive or be placed near to one or more seeds to facilitate the germination thereof. In this case, the evaporation device may be given a shape and size that conveniently allows the seeds to be secured in or near the evaporation device.

Figure 8:
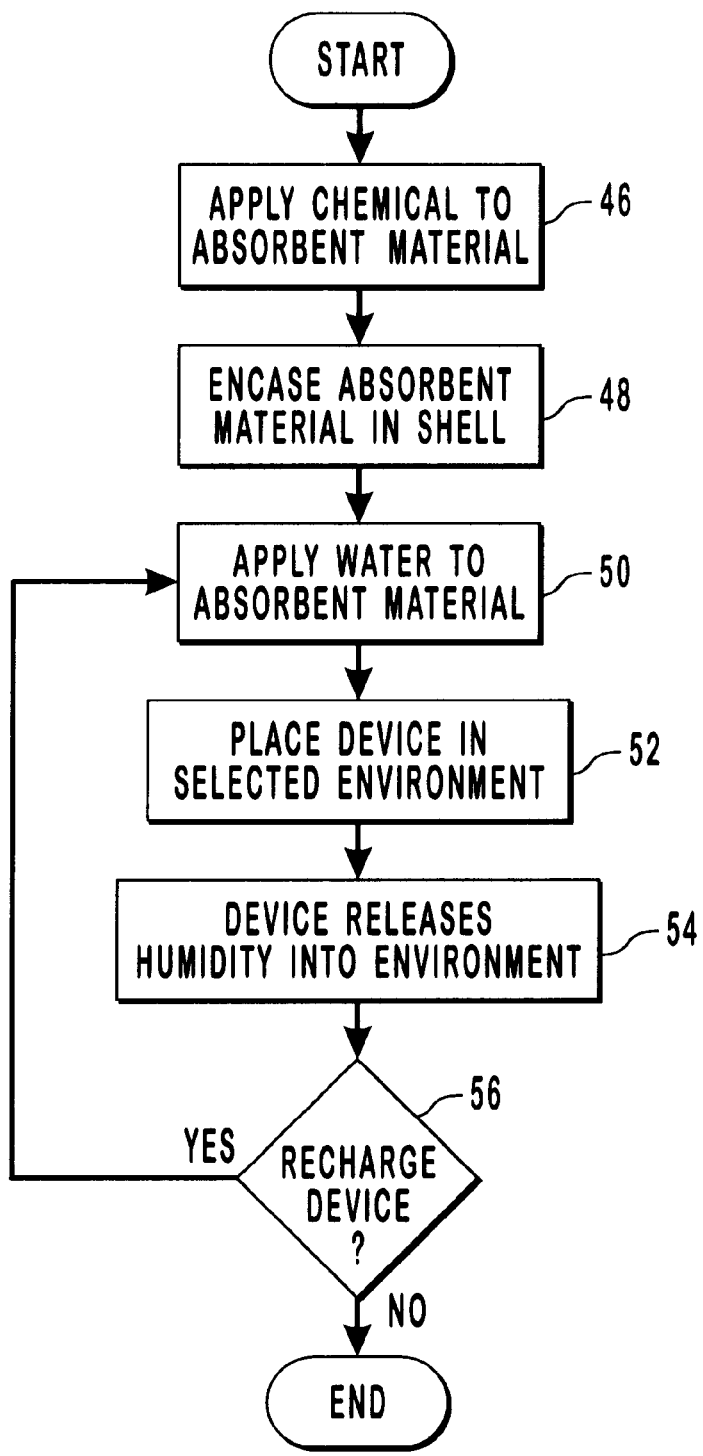
FIG. 8 is a flow chart illustrating the steps of a method according to the invention for assembling and later using an evaporation device to deliver humidity to the atmosphere.
Figure 9:
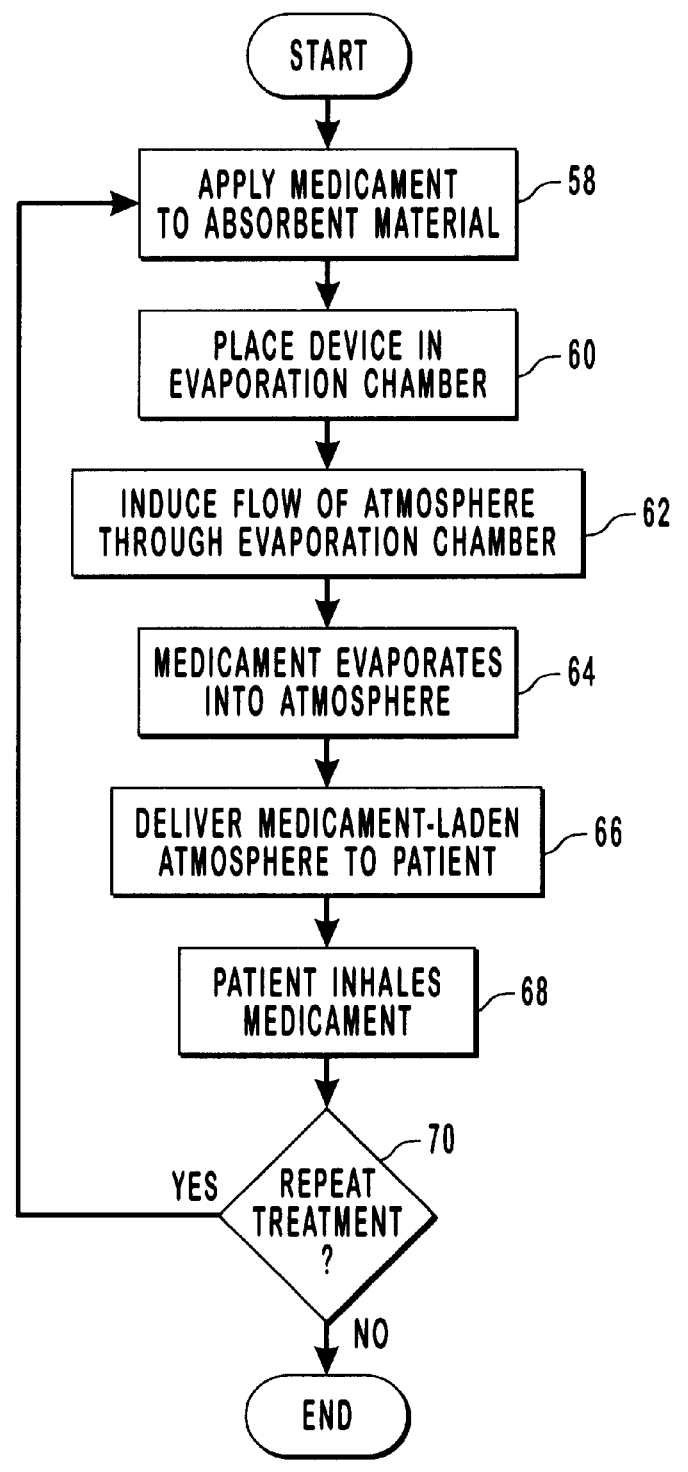

Examples of the methods of the invention are illustrated in the flow charts of FIGS. 8 and 9. The flow chart of FIG. 8 represent one example of manufacturing and then using the evaporation devices in, for example, the environments of FIGS. 2–6. As shown in step 46, one or more chemicals such as aspirin and sodium bicarbonate, are applied to the absorbent material of the evaporation device. Alternatively, however, the invention can be practiced without evaporation enhancing chemicals. In step 48, the absorbent material is encased in the shell. At this stage in the method, the evaporation device has been manufactured and is ready for use.

In step 50, water is applied to the absorbent material by immersing the evaporation device in a volume of water or by pouring water over the evaporation device. Some of the water is absorbed into and retained by the absorbent material. The evaporation device is then placed in the selected environment into which humidity is to be introduced in step 52. As shown by step 54, the evaporation device releases humidity into the environment as disclosed herein. Depending on the nature of the environment, the absorbent material may eventually dry out, at which point the evaporation device can be recharged. According to decision block 56, if the evaporation device is to be recharged, the method advances again to step 50.

FIG. 9 illustrates a method of manufacturing and then using the evaporation device to administer a medicament to a patient. The method of FIG. 9 may be practiced, for example, in the environment illustrated in FIG. 6. In step 58, a medicament is applied to the absorbent material or to another structure in the shell of the evaporation device according to the techniques disclosed herein. In step 60, the evaporation device is placed in an evaporation chamber, such as chamber 34 of FIG. 6. In step 62, a flow of oxygen or air is induced through the evaporation chamber The medicament then evaporates into the atmosphere in step 64. According to step 66, the medicament-laden atmosphere is delivery to the patient. Next, in step 68, the medicament is inhaled by the patient. As shown in decision block 70, the treatment can be repeated the same or for a different patient, in which case the method advances again to step 58.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for modifying the atmosphere in proximity to the apparatus, comprising:
    a shell having at least one hole formed therethrough;
    an absorbent material substantially enclosed by the shell, the absorbent material being adapted to absorb an aqueous composition, the absorbent material further being formed from multiple pieces, such that air space is present within the shell; and
    said aqueous composition, wherein said aqueous composition is absorbed by the absorbent material and has been formed from combining at least water, sodium bicarbonate and acetylsalicylic acid.

2. An apparatus as recited in claim 1, wherein the multiple pieces of the absorbent material are formed such that the air space is present in one or more interstices between the absorbent material and shell and between individual pieces of the multiple pieces.

3. An apparatus as recited in claim 1, wherein the shell is substantially rigid.

4. An apparatus for modifying the atmosphere in proximity to the apparatus, comprising:
    a substantially rigid shell having a plurality of holes formed therethrough;
    an absorbent material being substantially enclosed by the shell; and
    a composition having been absorbed by the absorbent material, the composition being formed from combining at least water, sodium bicarbonate and acetylsalicylic acid.

5. An apparatus as recited in claim 4, wherein the absorbent material is formed from multiple pieces such that air space exists in one or more interstices formed between the absorbent material and the shell and between individual pieces of the multiple pieces.

6. An apparatus as recited in claim 4, wherein the absorbent material comprises sponge.

7. A method for modifying the atmosphere in proximity to the apparatus, comprising the steps of:
    obtaining an apparatus that includes:
        a shell having at least one hole formed therethrough; and
        an absorbent material substantially enclosed by the shell;
    applying the liquid to the apparatus, such that a composition formed from combining at least water, sodium bicarbonate, and acetylsalicylic acid is absorbed by the absorbent material; and
    placing the apparatus in a location in proximity to the atmosphere that the composition is to modify.

8. A method as recited in claim 7, wherein the apparatus, when it is obtained, further includes sodium bicarbonate deposited at the absorbent material.

9. A method as recited in claim 8, wherein the apparatus, when it is obtained, further includes acetylsalicylic acid deposited at the absorbent material.

10. A method as recited in claim 9, wherein the liquid comprises water, the step of applying the liquid to the apparatus comprising the step of applying the water to the apparatus such that the water combines with the sodium bicarbonate and the acetylsalicylic acid to form the composition.

11. A method as recited in claim 10, wherein the step of placing the apparatus in a location comprises the step of placing the apparatus in a refrigerated space in which food is stored.

12. A method as recited in claim 7, wherein the apparatus, when it is obtained, further includes acetylsalicylic acid deposited at the absorbent material.

13. A method as recited in claim 7, wherein the step of applying the liquid to the apparatus comprises the step of applying to the apparatus a composition that has been formed from combining at least water, sodium bicarbonate, and acetyisalicylic acid prior to the step of applying the composition.

14. A method as recited in claim 7, wherein the step of placing the apparatus in a location comprises the step of placing the apparatus in a space in which food is stored.

15. A method as recited in claim 14, wherein the space is refrigerated.

16. A method for maintaining the shelf life of food, comprising the steps of:
    obtaining an apparatus that includes:
        a shell having at least one hole formed therethrough;
        an absorbent material substantially enclosed by the shell, the absorbent material being present in an amount such that air space is present within the shell when the absorbent material is dry; and
        a composition deposited at the absorbent material, the composition being formed from combining at least sodium bicarbonate and acetylsalicylic acid;
    applying water to the apparatus, such that the water is absorbed by the absorbent material and combines with the composition to form an aqueous composition; and
    placing the apparatus in a space in which food is stored, such that the aqueous composition modifies the atmosphere that is in close proximity to the food.

17. A method as recited in claim 16, further comprising recharging the apparatus after a period of time by reapplying water to the apparatus.

18. A method as recited in claim 17, further comprising recharging the apparatus after a period of time by applying to the apparatus a second composition that is formed from combining at least water, sodium bicarbonate, and acetylsalicylic acid.

19. A method as recited in claim 16, further comprising the step of causing air to circulate within the space in proximity to the apparatus.

20. A method as recited in claim 16, wherein the space is refrigerated.

21. A method as recited in claim 16, wherein the space is a refrigerated space associated with a produce truck.

22. A method as recited in claim 16, wherein the food comprises produce.

23. A method as recited in claim 16, wherein the food comprises meat.

24. A method as recited in claim 16, wherein the food comprises cheese.

25. A method as recited in claim 16, wherein the food comprises non-refrigerated food.

26. A method as recited in claim 16, wherein the absorbent material is formed from multiple pieces, such that the air space is present within the shell.

* * * * *